(12) United States Patent
Rolland et al.

(10) Patent No.: US 11,025,027 B2
(45) Date of Patent: Jun. 1, 2021

(54) PRECISION FREQUENCY COMBS

(71) Applicant: IMRA America, Inc., Ann Arbor, MI (US)

(72) Inventors: Antoine Jean Gilbert Rolland, Longmont, CO (US); Marco Cassinerio, Ypsilanti, MI (US); Jie Jiang, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 78 days.

(21) Appl. No.: 16/576,371

(22) Filed: Sep. 19, 2019

(65) Prior Publication Data

US 2020/0014167 A1 Jan. 9, 2020

Related U.S. Application Data

(63) Continuation of application No. PCT/US2018/039542, filed on Jun. 26, 2018.
(Continued)

(51) Int. Cl.
*H01S 3/13* (2006.01)
*H01S 3/11* (2006.01)
(Continued)

(52) U.S. Cl.
CPC .......... *H01S 3/1307* (2013.01); *H01S 3/1112* (2013.01); *H01S 3/1305* (2013.01);
(Continued)

(58) Field of Classification Search
CPC ................ H01S 3/1305; H01S 3/1112; H01S 3/1307; H01S 3/005; H01S 3/1115; H01S 3/13; H01S 2301/02
See application file for complete search history.

(56) References Cited

U.S. PATENT DOCUMENTS 5,974,074 A * 10/1999 Mayor ................. H04B 10/11
359/338
7,602,825 B1 10/2009 Lin et al.
(Continued)

FOREIGN PATENT DOCUMENTS

WO     WO 01/44681 A2     6/2001
WO     WO 2016/134853 A1  2/2015
(Continued)

OTHER PUBLICATIONS

International Search Report and Written Opinion in corresponding International Patent Application No. PCT/US2018/039542, dated Dec. 14, 2018, in 17 pages.
(Continued)

*Primary Examiner* — Kinam Park
(74) *Attorney, Agent, or Firm* — Knobbe, Martens, Olson & Bear, LLP

(57) ABSTRACT

Examples of compact control electronics for precision frequency combs are disclosed. Application of digital control architecture in conjunction with compact and configurable analog electronics provides precision control of phase locked loops with reduced or minimal latency, low residual phase noise, and/or high stability and accuracy, in a small form factor.

23 Claims, 9 Drawing Sheets

Related U.S. Application Data

(60) Provisional application No. 62/527,623, filed on Jun. 30, 2017.

(51) Int. Cl.
  *H01S 3/067* (2006.01)
  *H01S 3/00* (2006.01)

(52) U.S. Cl.
  CPC ............. *H01S 3/005* (2013.01); *H01S 3/0675* (2013.01); *H01S 3/1115* (2013.01); *H01S 3/13* (2013.01); *H01S 2301/02* (2013.01)

(56) References Cited

U.S. PATENT DOCUMENTS

| | | | |
|---|---|---|---|
| 8,170,387 | B2 | 5/2012 | Hartl et al. |
| 8,792,525 | B2 | 7/2014 | Fermann et al. |
| 8,970,252 | B2 | 3/2015 | Gupta |
| 9,166,361 | B2 | 10/2015 | Hartl et al. |
| 9,401,579 | B2 | 7/2016 | Fermann et al. |
| 9,557,625 | B2 | 1/2017 | Coddington et al. |
| 9,698,559 | B2 | 7/2017 | Fermann et al. |
| 2003/0185255 | A1 | 10/2003 | Ye et al. |
| 2010/0040322 | A1* | 2/2010 | Li .......................... G02F 1/065 385/3 |
| 2011/0267671 | A1* | 11/2011 | Peng ...................... H01S 3/115 359/257 |
| 2012/0163749 | A1* | 6/2012 | Huang ............... G02B 6/12004 385/3 |
| 2013/0293264 | A1* | 11/2013 | Gupta ................. H03K 19/177 326/45 |
| 2016/0248217 | A1 | 8/2016 | Fermann |
| 2017/0324210 | A1* | 11/2017 | Zhang ................. H01S 3/06754 |
| 2018/0034233 | A1* | 2/2018 | Fischer ................... H01S 3/137 |
| 2018/0180655 | A1* | 6/2018 | Kuse ...................... G01R 29/26 |
| 2018/0341164 | A1* | 11/2018 | Williams ............. G02F 1/2255 |

FOREIGN PATENT DOCUMENTS

| | | |
|---|---|---|
| WO | WO 2018/044500 A1 | 3/2018 |
| WO | WO 2019/005824 A1 | 1/2019 |

OTHER PUBLICATIONS

Hudson et al., "Mode-locked fiber laser frequency-controlled with an intracavity electro-optic modulator," Optics Letters vol. 30, Issue 21, Nov. 2005, pp. 2948-2950.

J. Li et al., "Electro-optical frequency division and stable microwave synthesis", Science, vol. 345, Issue 6194, Jul. 18, 2014, pp. 309-313.

Roberto Selow et al., "A Comparison of FPGA and FPAA Technologies for a Signal Processing Application," 2009 International Conference on Field Programmable Logic and Applications, Aug. 2009, in 6 pages.

T. Schibli et al., "Phase-locked widely tunable optical single-frequency generator based on a femtosecond comb," Optic Letters, vol. 30, Issue 17, Sep. 2005, pp. 2323-2325.

\* cited by examiner

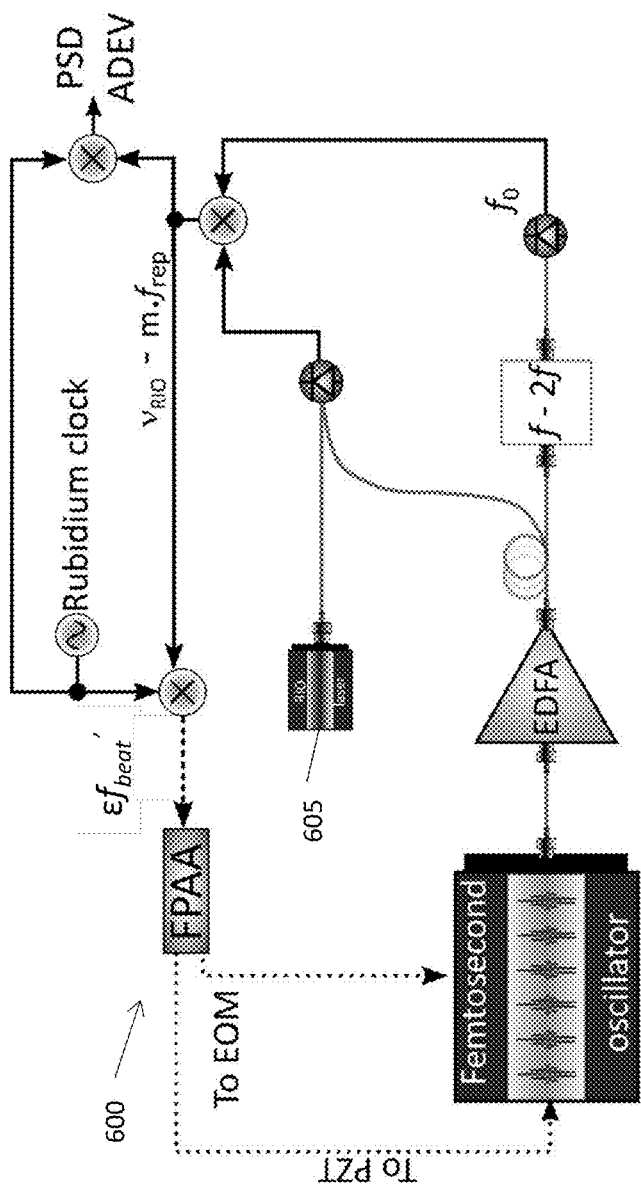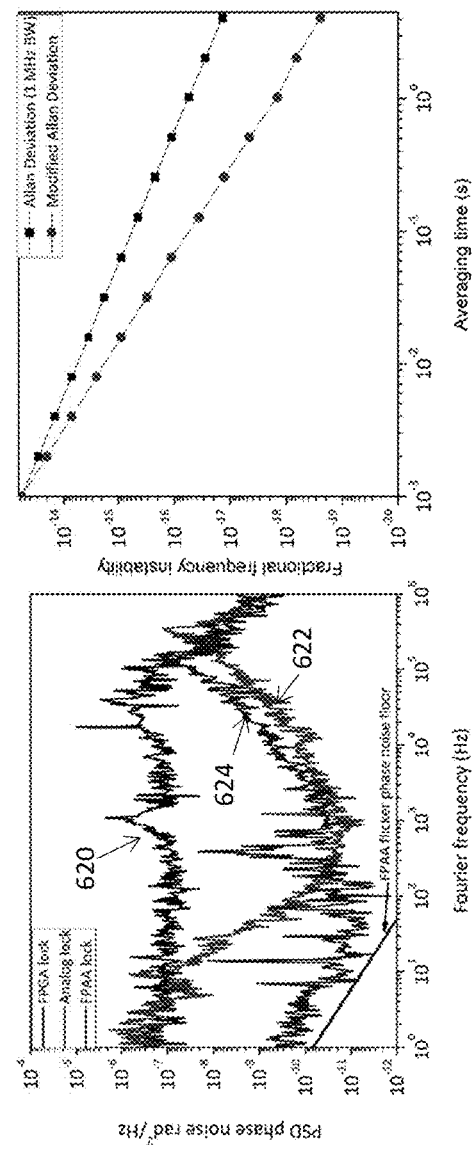
Fig. 6A
Fig. 6B
Fig. 6C

PRECISION FREQUENCY COMBS

CROSS-REFERENCE TO RELATED APPLICATIONS

This application is a continuation of International Patent Application No. PCT/US2018/039542, filed Jun. 26, 2018, which claims the benefit of priority to U.S. Provisional Patent Application No. 62/527,623, filed Jun. 30, 2017, both of which are entitled PRECISION FREQUENCY COMBS, and both of which are hereby incorporated by reference herein in their entireties.

BACKGROUND

Field

The present disclosure relates to the construction of control electronics for precision control of frequency combs.

Description of the Related Art

A frequency comb comprises a laser source having frequency components separated by a frequency spacing, $f_{rep}$, the repetition rate of the laser oscillator, and offset from a reference frequency by a frequency offset, $f_{ceo}$, the carrier envelope offset (CEO) frequency. The frequency of a comb line (sometimes referred to as a mode of the comb) can be expressed as $f_n = f_{ceo} + n\, f_{rep}$, where n is an integer identifying the comb line (sometimes referred to as the n-th comb mode).

SUMMARY

With recent advances in frequency combs, the precision control of frequency combs in a small form factor is increasingly important for further advancing this technology. Various embodiments of systems and methods for precise frequency control of frequency combs are described herein. Examples include hybrid phase locked technology systems comprising a combination of field programmable gate arrays (FPGA) and field programmable analog arrays (FPAA).

The present disclosure describes examples of compact control electronics for precision frequency combs. Via the application of a digital control architecture in conjunction with compact and configurable analog electronics, precision control of phase locked loops with minimal latency, low residual phase noise, and/or high stability and accuracy, is possible in a small form factor. In the following, we use the term hybrid locking schemes for various embodiments of such a control architecture. Using a hybrid locking scheme, the carrier envelope offset frequency $f_{ceo}$ of a comb can be stabilized with large bandwidth via phase locking to an external radio frequency (RF) reference, allowing the use of relatively noisy combs in precision frequency comb applications. In conjunction with an optical frequency reference, a beat signal $f_{beat}$ between the optical frequency reference and a mode of the frequency comb can be stabilized analogously, providing for accurate, high bandwidth control of the frequency comb spectrum.

In an example embodiment, a hybrid locking scheme is performed with a relatively slow control loop based on digital FPGAs (Field programmable gate arrays), whereas a fast control loop is based on fast analog FPAAs (Field programmable analog arrays). Both FPGAs and FPAAs are chip based and can be integrated into a very compact assembly. In principle, FPGAs and FPAAs can also be integrated onto a single printed circuit board (PCB).

In an example embodiment, the FPGA can be configured as a coarse servo-controller to bring the plant (for example a beat signal such as $f_{ceo}$ or $f_{beat}$ related to the operation of a frequency comb) to a set point without any external action required from the user. Moreover, the FPGA can also be configured to continuously improve or optimize the controller parameters of the fast or fine phase locked loop based on the FPAA, allowing for fully automated control of a frequency comb even in the presence of changing comb laser parameters and aging of components. The controller can comprise a proportional-integral-derivative (PID) controller.

Specifically, in an embodiment, the FPGA can be configured to calculate the open-loop transfer function between the input to the actuators and the input to the PID (e.g., the error signal input to the PID). From this information the PID parameters of both the FPGA and FPAA can be obtained. The fast FPAA can remain engaged the whole time; if the actuators are outside of the locking range of the FPAA, it is generally sufficient to change the gain of the PID parameters to prevent the onset of oscillations in the feedback loop. At the same time a ramp voltage can be applied to the actuator via the FPGA to find an optimum set point for the FPAA control. In addition the FPGA can calculate a Fourier transform from the error signals in real time to estimate the phase noise of the achieved phase locked loop as well as other locking parameters, such as phase noise power spectral density of $f_{beat}$ and $f_{ceo}$ as well as an in-phase-quadrature (I-Q) diagram, thereby continuously monitoring the quality of the phase locked loop. Also, via inclusion of a frequency counter inside the FPGA, a measure of frequency stability (e.g., an Allan variance) of $f_{beat}$ and $f_{ceo}$ can be determined. With control via the FPGA, the FPAA parameters can be continuously adjusted to ensure that any controlled elements stay within the locking range of the FPAA and to prevent undesired oscillation of the FPAA.

In an example configuration, to maximize the bandwidth of the phase locked loop, the error signal generated by the beat between the desired comb parameter and an RF reference can be directed to both the FPGA and FPAA via an RF splitter, thus bypassing the FPGA and directing the error signal directly to the FPAA.

In an example configuration, digitized $f_{beat}$ and $f_{ceo}$ signals can also be directed to the FPGA and used for global control of the laser actuators. These signals can also be used for in-loop analysis, measurement and display of RF spectra corresponding to these beat signals.

In another example embodiment, the FPGA control can further be expanded to include other functionalities such as phase locking of a dual comb system or a triple comb system or locking of a continuous wave (cw) reference laser to an optical reference cavity, which can be used for optical frequency division schemes for low phase noise RF generation.

More generally, additionally or alternatively to FPGAs, any general phase locking architecture based on digitized input signals can be used. Similarly, additionally or alternatively to FPAAs, any phase locking architecture based on analog electronics can be used. In this disclosure, we use the terms FPGA and FPAA only as representative for such digital and analog control electronics, respectively.

The foregoing summary and the following drawings and detailed description are intended to illustrate non-limiting examples but not to limit the disclosure.

BRIEF DESCRIPTION OF THE DRAWINGS

FIG. 6A shows an example experimental system to measure the in-loop phase noise of a beat signal generated from a frequency comb when using FPAA, FPGA, and analog phase locking.

FIG. 6B shows a comparative measurement of the phase noise spectral density of a beat signal generated from a frequency comb when using FPAA, FPGA, and analog phase locking.

FIG. 6C shows the corresponding Allan and Modified Allan deviation corresponding to the spectral phase noise density shown in FIG. 6B.

The figures depict various embodiments of the present disclosure for purposes of illustration and are not intended to be limiting. Wherever practicable, similar or like reference numbers or reference labels may be used in the figures and may indicate similar or like functionality.

DETAILED DESCRIPTION

Overview

Figure 1:
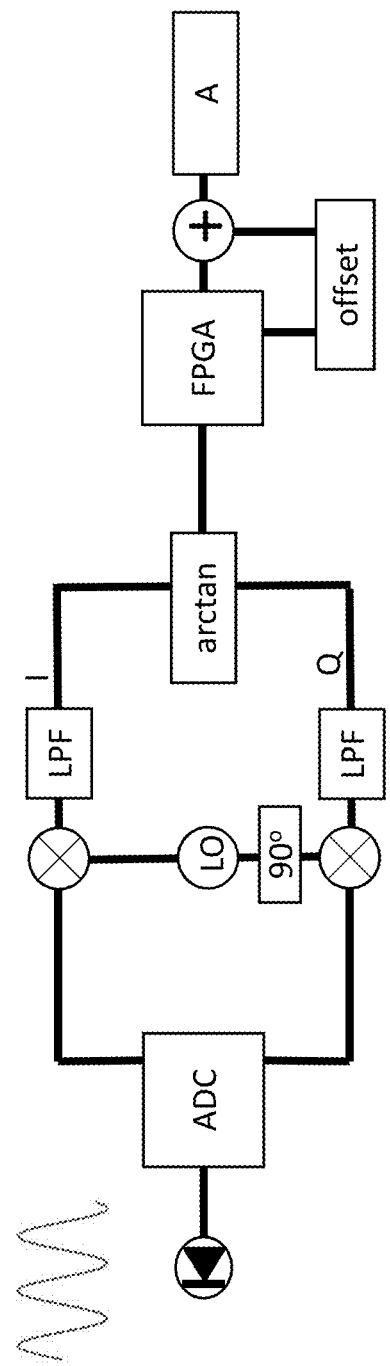
FIG. 1 shows an example phase locking architecture for a frequency comb.

Phase locked loops are ubiquitous in microwave technology and communications and generally aim to produce an output signal which is proportional to the phase of an input signal, thereby allowing for phase locking of a system frequency to an external reference frequency. The system frequency is moreover dependent on internal actuators that are controlled by the output of the phase locked loop.

For reliable operation of phase lock loops, they often also include a frequency detection stage or a coarse phase locking stage which ensures that the system operating point is within the capture range of an additional fine phase locking stage, which minimizes the phase noise of the actual phase locked loop. For example, a fine phase locking stage has a typical linear capture range smaller than $2\pi$ and a limited actuation range. Outside of this capture range the system operating point is outside of the maximum actuation range, leading to a phase unlocked condition. Such frequency/phase locking schemes or coarse/fine phase locking schemes are well known in the state of the art and for example discussed on page 258, of RF Microelectronics by Behzad Razavi.

Many different implementations of this coarse/fine phase locking architecture are well known in the state of the art. In some configurations the capture range can be extended by the use of appropriate pre-scalers, though locking range extension via pre-scaling is mainly implemented for coarse phase locking stages due to the reduction in feedback bandwidth arising from pre-scaling. As another example frequency counters can be used to move to the system parameters to the capture range of the phase locked loop, frequency trackers or any other digital signal processing (DSP) based solution are other alternatives. Also many different implementations of the fine phase locked loop are possible such as cascading of phase locked loops with different feedback bandwidths or any other DSP based solution or other alternatives.

Coarse/fine locking schemes are also well known in laser technology and were for example suggested for locking the repetition rate of modelocked lasers to each other, as discussed in U.S. patent application 2003/0185255 to Ye et al. and also for locking the repetition rate of a modelocked laser to an external frequency reference as discussed in U.S. Pat. No. 7,602,825 to Lin et al., Coarse/fine phase locking schemes via DSP were also used for control of frequency combs as discussed in T. Schibli et al., 'Phase-locked widely tunable optical single-frequency generator based on a femtosecond comb', Opt. Lett., 30, 2323 (2005). Other examples of the application of coarse/fine phase locking schemes to frequency combs can also be found in M. Fischer et al., PCT publication WO 2016/134853. Coarse/fine phase locking schemes based on DSP or FPGAs were also discussed in U.S. Pat. No. 9,557,625 to I. Coddington et al.

However, though some of these schemes may be suitable for low precision operation and stabilization of frequency combs, for precision applications of frequency combs they may not be adequate. Generally frequency combs can be subject to phase noise at relatively high frequencies which requires high bandwidth actuators and phase locked loops for noise suppression. For example it was suggested that loss modulators can be incorporated into frequency combs to allow control of the carrier envelope offset frequency $f_{ceo}$ of a frequency comb with MHz feedback bandwidths, as disclosed in U.S. Pat. Nos. 9,698,559 and 8,792,525 both to Fermann et al. Feedback bandwidths of a few MHz can be useful in reducing or minimizing the phase noise of $f_{beat}$ as for example described in 'Mode-locked fiber laser frequency-controlled with an intracavity electro-optic modulator', Opt. Lett., 30, 2948 (2005) to D. D. Hudson et al.

Though feedback bandwidths of a few MHz can be achieved with standard analog phase locked loops, their automation is typically challenging and their form factor is too large for many applications in laser technology, especially when more than one control loop is required, which is often the case for frequency combs or other complex systems. Recently, in conjunction with radar technology, field programmable analog arrays (FPAAs) or FPAAs in conjunction with field programmable gate arrays (FPGAs) were suggested in U.S. Pat. No. 8,970,252 for rapid processing of wideband analog signals in conjunction with analog I/Q signals directly fed into the FPAA. In radar technology, I/Q detection allows discerning amplitude and phase variations in object detection, where amplitude variations are related to noise and phase variation can be related to object movement speed.

To date there is still a need for rapid electronic processing technology adapted for large bandwidth laser control or generally for large bandwidth control of frequency comb parameters with low quantization noise. Quantization noise can for example arise from limited bit resolution in analog-to-digital converters (ADC) and digital-to-analog converters (DAC) implemented in phase-locked loops.

In the present disclosure, examples of hybrid phase locked technology systems comprising a combination of FPGA and FPAA technology that overcome some or all of the above limitations are described.

As further described herein, an FPAA can comprise a dynamically programmable analog signal processor that provides real time dynamic reconfigurability. An FPAA can be programmed to implement multiple analog functions such as a low pass filter, a bandpass filter, a high pass filter, or even more complex filter designs up to, e.g., 5-pole. An FPAA can comprise an integrated circuit including interconnected configurable analog blocks (CAB). The CAB can contain an operational amplifier, programmable capacitor arrays, programmable resistor arrays for continuous-time circuits or configurable switches for switched-capacitor circuits, and programmable on-chip memories. The CAB can act as integrators, summers, attenuators, and networks of CAB can provide higher-level analog functionality. For example, an FPAA can be configured to implement a PID controller or lead-lag compensator architecture that may be particularly suitable to influence disciplines as varied as robotics, satellite control, automobile diagnostics, and laser frequency stabilization. An FPAA can operate on a wideband analog signal (e.g., greater than 100 kHz to greater than 1 to 10 MHz). An advantage of FPAAs is that analog signals do not need to be digitized (e.g., using an ADC), which can result in lower power consumption and improved processing speed.

As further described herein, an FPGA can comprise an integrated circuit including interconnected programmable logic blocks and memory blocks to implement digital computations. In contrast to FPAAs which use analog signals, an input analog signal for an FPGA can be digitized (e.g., via an ADC either separate from or integrated into the FPGA), and the resulting digital signal can be used by the FPGA logic blocks. An FPGA can be configured to implement a PID control architecture. As described further below, an FPGA can have a locking range of tens or hundreds of MHz and even larger, whereas the locking range of an FPAA can be smaller than 10 MHz or even smaller than 1 MHz.

Example Controllers for Precision Frequency Combs

FIG. 1 shows an example of a phase locking architecture for a frequency comb. Here a beat signal is detected with a photodetector and digitized with appropriate analog to digital converters (ADC) and subsequently split in two. The two resulting digital signals are then mixed with the in-phase (I) and quadrature (Q) components of a digital local oscillator (LO) signal as for example obtained via direct digital synthesis (DDS). After passing through low pass filters (LPF) the phase φ of the beat signal with respect to the local oscillator is obtained via performing the calculation φ=arctan(I/Q), where relatively large phase excursions can be monitored via appropriate unwrapping of the phase. A subsequent FPGA-based proportional-integral-derivative (PID) controller then provides appropriate digital signals, which are subsequently converted to analog signals via a digital to analog converter for some laser or comb laser actuator A (more than one actuator can also be used). An adjustable offset voltage, current, etc. can further be applied to these actuators to move the actuators into the locking range of the FPGA based PID controllers. The offset can also be controlled via the FPGA as shown in FIG. 1. The phase locking architecture shown in FIG. 1 is based on the comb system described in U.S. Pat. No. 9,557,625 to I. Coddington et al.

Though this control architecture is relatively simple, the latency of the ADC/DAC stages and the digital PID severely limits the bandwidth of the control loop as well as the phase accuracy due to residual phase errors arising from quantization noise in the ADC and DAC.

Figure 2:
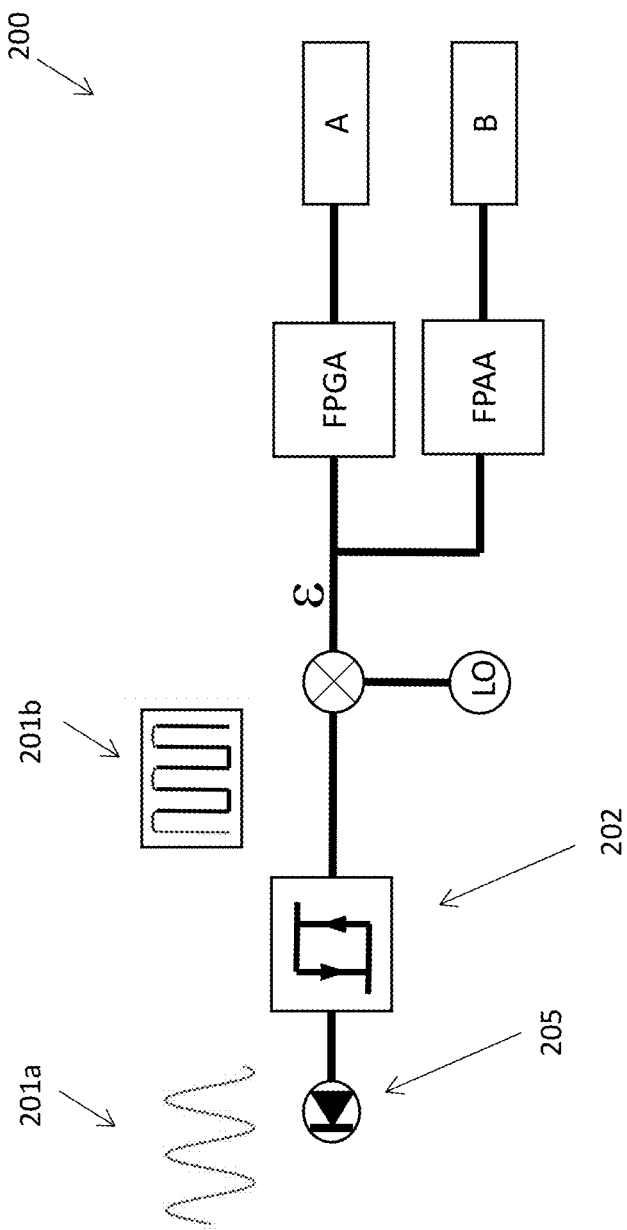
FIG. 2 shows an example of a hybrid phase locking system.

A more advanced hybrid phase locking system 200 according to a first embodiment is shown in FIG. 2. An optical beat signal in the RF domain is detected with an optical-to-electronic converter (OEC) 205, e.g., a photodetector, and thereby converted to the RF domain. The beat signal can be subsequently conditioned by a comparator 202 with hysteresis, which transforms the sinusoidal input optical beat signals 201a into a squared signal 201b, removing the uncertainties in the zero crossing and thus removing noise, as further illustrated in FIG. 2. The squared signal 201b is mixed with a local oscillator (LO) producing an error signal c at the output of the mixer. The local oscillator can also be conditioned into a squared signal, but it is not a requirement.

The error signal is then split in two and injected into an FPAA-based PID loop and an FPGA-based PID loop. Alternatively, the beat signal can also be split in two up-stream of the comparator 202; one part can then go to the FPGA, whereas the other part can be directed to the FPAA-based PID loop via mixing with an appropriate locator oscillator signal, thus reducing or minimizing the latency of the FPAA-based PID loop and increasing or maximizing its bandwidth.

The FPGA further contains an ADC to digitize the error signal. Alternatively, the ADC can be located upstream of the FPGA. The output signals of the two PIDs are then used to control an actuator each (actuators A and B, as shown in FIG. 2). In order to take advantage of the fast processing ability of the FPAA (compared to the FPGA), preferably, the PID signals generated by the FPAA are injected into the faster actuators and the PID signals generated from the FPGA are injected into the slower actuator. For example, in some implementations, the faster actuator (e.g., the actuator B coupled to the FPAA) can have a response bandwidth greater than 100 kHz, and the slow actuator (e.g., the actuator A coupled to the FPGA) can have response bandwidth less than 100 kHz. In the laser system embodiments described herein, actuators that can control the laser system (or a resulting comb) can be used for, e.g., control of the repetition rate, carrier envelope offset frequency, beat signals, etc., and such actuators can include electro-optic modulators (EOMs), acousto-optic modulators, graphene or electro-absorption modulators, piezoelectric transducers, as well as actuators that control or modulate pump power to the laser system. In some laser/comb systems, the actuators are intra-cavity actuators that modulate the transmission or reflection loss of an optical element (such as a saturable absorber, graphene film, dielectric material, etc.).

More than one PID can be incorporated into the FPGA as well as the FPAA. Thus more than one actuator each can be controlled by each of the FPGA and the FPAA. The FPGA (as well as the FPAA) can also be configured to cascade PIDs and actuators of different bandwidth, where the fastest FPGA (or FPAA) based PID receives the error signal first, the output of the fastest PID is split in two, and directed to the fastest actuator and the second fastest FPGA (or FPAA) based PID. The output of that PID is then again split in two, and directed to the second fastest actuator and the third fastest FPGA (or FPAA) based PID and so on.

The FPGA generally provides the coarse locking scheme and also ensures that the relevant actuators are moved into the locking range of the FPAA. In some example implementations, the FPGA can have a locking range of tens or hundreds of MHz and even larger, whereas the locking range of the FPAA can be smaller than 10 MHz or even smaller than 1 MHz. However, these locking ranges only serve as an example and depend on the actual system and actuators.

The PID parameters of the FPAA can be continuously controllable by the FPGA, allowing for adaptive control of the FPAA to ensure improved or optimum phase locked operation conditions during varying environments or in the presence of system aging. During the search for an optimum actuator position the PID parameters of the FPAA can be appropriately adjusted in order to prevent oscillation of the phase locked loop. Once the FPGA provides adequate coarse phase locking of the system, the FPAA provides the fine locking scheme. Continuous adjustment of the optimum actuator's position and PID parameters of the FPAA greatly improves the stability of the overall system in the presence of component aging or changing environmental conditions. In addition this allows the use of actuators with very small actuation ranges (e.g., <1 MHz), which typically have the highest response bandwidth (e.g., >100 kHz) while still ensuring stable operation of the system.

In FIG. 2, the beat signal 201a can be for example $f_{beat}$ or $f_{ceo}$ (sometimes also referred to herein as $f_0$) related to spectral control of a frequency comb. Both $f_{beat}$ or $f_{ceo}$ can be phase locked this way, or only one of the two, or two beat signals related to $f_{beat1}$ or $f_{beat2}$ related to the optical beats originating from two different comb lines as sometimes used in frequency comb technology for control of the comb spectrum. Moreover, using a signal 201a that is a sum of $f_{ceo}$ and $f_{beat}$ allows the controller to generate an RF signal representing an offset-free virtual frequency comb. This allows the controller to only phase-lock one of the two degrees of freedom of the optical frequency comb making it a very robust system.

Additionally, the integration of the hybrid phase-locking scheme can be adapted for phase locking (or phase comparing) a VCO (voltage controlled oscillator) to a reference laser (or reference frequency) through the use of a frequency comb as a transfer oscillator, as, for example, described in B. Lipphardt et al., 'Optical Stabilization of a Microwave Oscillator for Fountain Clock Interrogation', IEEE Transactions on Ultrasonics, Ferroelectrics, and Frequency Control, vol. 64, pp. 761 (2017). Phase locking of a VCO in this fashion allows the reduction of the VCO phase noise via feedback and construction of an ultra-low noise, robust and compact microwave oscillator without requirement of phase locking of the frequency comb to a reference laser. The hybrid phase locking scheme as discussed herein can be particularly useful for suppression of the phase noise of the VCO at high offset frequencies.

Alternative methods for phase noise reduction of VCOs via high bandwidth feedback loops exist and were for example discussed in U.S. Patent Application No. 62/462, 591, filed Feb. 23, 2017 and J. Li et al., 'Electro-optical frequency division and stable microwave synthesis', Science, vol. 345, pp. 309 (2014). Embodiments of the present hybrid phase locking architecture can be used to simplify the required phase locked loops and to generally produce low phase noise microwave sources.

Embodiments of the present hybrid phase locking system can be used with frequency combs based on fiber, solid-state, diode or quantum cascade lasers. Alternatively, the comb spectrum of microresonator-based combs can also be controlled this way. Embodiments of the hybrid phase locking scheme as discussed here can also be used to lower the phase noise of a VCO, OEO (opto-electronic oscillator) or coupled OEO via appropriate feedback control for low noise microwave signal generation. Moreover, the implementation of such a hybrid phase locking system is not limited to frequency combs, but can be used wherever precision phase locked loops are required, for example also in wireless and optical communication systems. For such applications, an antenna or other detection schemes can for example replace the photodiode.

Note that in the phase locking scheme described with reference to FIG. 1, the optical beat signal is digitized directly prior to mixing with an RF local oscillator. In conjunction with an FPAA such a configuration would be highly undesirable, because the limited bandwidth of the ADC would limit the bandwidth of the FPAA and in order to operate the FPAA, the digitized signal would need to be converted back into an analog signal to be injected into the FPAA.

In an alternative embodiment of the hybrid phase locking system 200, the comparator 202 can be eliminated and the beat signal 201a split between the FPAA and the FPGA. The FPAA signal branch can then be mixed with a local oscillator and directed to the FPAA. The other signal branch can also be digitized and subsequently mixed with the I and Q components of a local oscillator, for example based on DDS, to provide phase and amplitude information via the FPGA.

Figure 3:
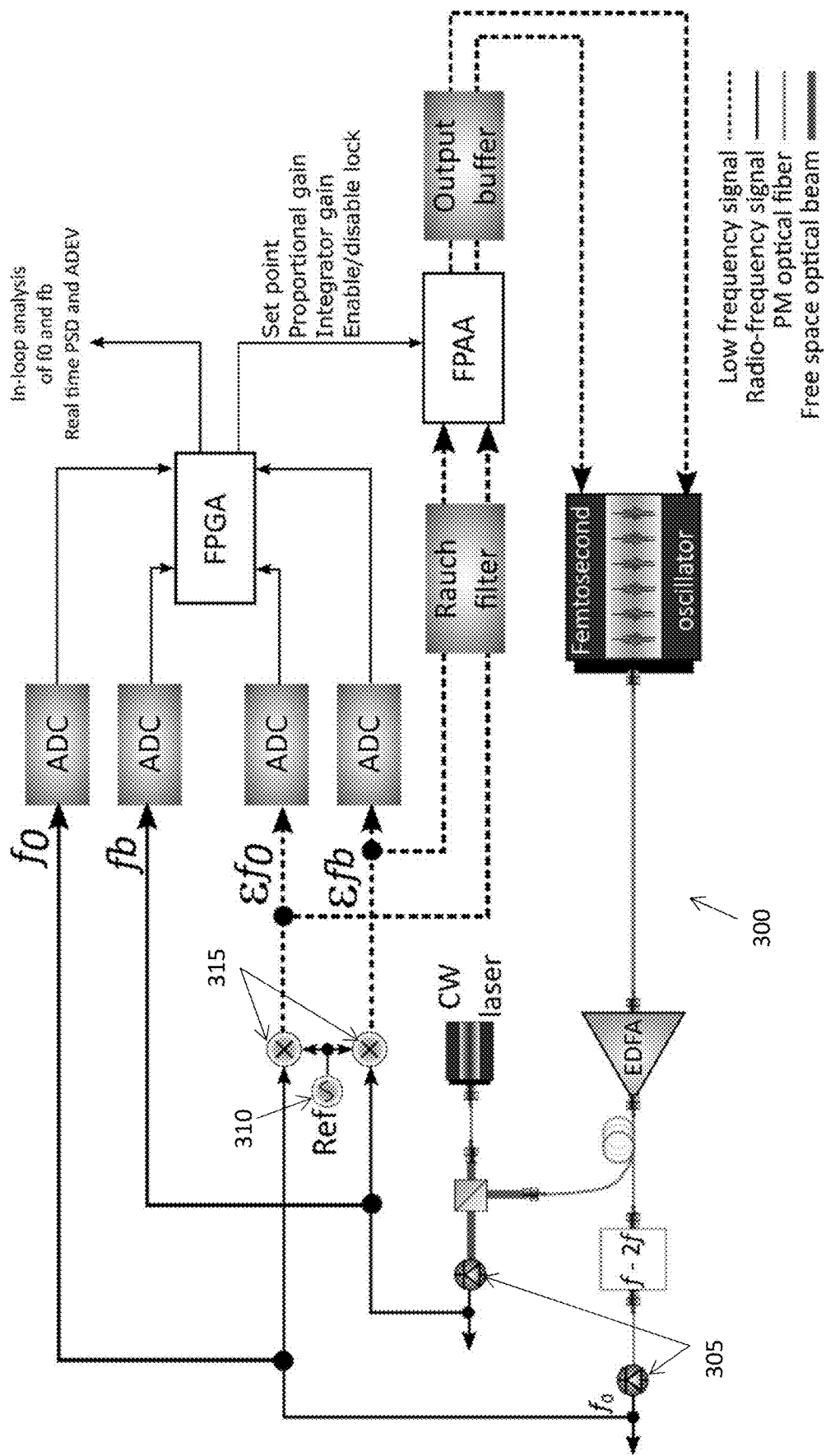
FIG. 3 shows an example embodiment of a hybrid phase locking system for a frequency comb.

FIG. 3 shows an example embodiment of a hybrid phase locking system 300 adapted to a fiber frequency comb laser. A femtosecond fiber oscillator comprises actuators for $f_{ceo}$ and $f_{beat}$ control (e.g., EOMs, PZTs, etc.). Examples of such femtosecond fiber oscillators are for example disclosed in U.S. Pat. Nos. 9,698,559, 8,792,525, and 9,401,579 to Fermann et al., and U.S. Pat. No. 8,170,387 to Hartl et al., each of which is hereby incorporated by reference herein in its entirety. These actuators are not separately shown, but indicated via the errors pointing towards the femtosecond oscillator. Conveniently the output of the femtosecond fiber oscillator can be amplified in an erbium-doped fiber amplifier (EDFA). For example, the output of the femtosecond oscillator can be optically coupled to the EDFA via an optical fiber (which may be polarization maintaining (PM)). One part of the output of the amplifier can be directed to an f-2f interferometer (or 2f-3f interferometer) for $f_{ceo}$ detection, whereas the other part can be interfered with a continuous wave (cw) laser for $f_{beat}$ detection (e.g., via a beamsplitter shown in FIG. 3). Appropriate OECs (e.g., photodetectors) 305 are used for $f_{ceo}$ (referred to as $f_0$ in FIG. 3) and $f_{beat}$ detection. Appropriate supercontinuum generating fibers and waveguides and additional amplifiers can also be inserted as desired. For optical clock applications, the cw laser can be additionally locked to an optical frequency reference.

The outputs of the photodetectors 305 are mixed with a local oscillator signal 310 (referred to as Ref in FIG. 3), where for simplicity only a single oscillator is shown. In other implementations, two different local oscillators 310 can be used for mixing with $f_{ceo}$ and $f_{beat}$ (shown as f in FIG. 3). The mixers 315 produce corresponding error signals $\varepsilon f_0$ and $\varepsilon f_{beat}$, which are directed to appropriate analogue to digital converters (ADC) and an FPGA. A fraction of the error signals is further split off and directed to an FPAA via an input buffer filter, such as a Rauch filter (or other type of active filter or multiple feedback filter). The output of the FPGA controls the PID parameters of the FPAA-based PID loop. The output of the FPAA is directed via appropriate output buffer filters, such as another Rauch filter to the actuators of the femtosecond oscillator. The output of the FPGA can also control additional actuators within the femtosecond oscillator (not shown).

The beat signals $f_0$ and $f_{beat}$ generated by the photodetectors 305 can be further directed to additional ADCs and the FPGA for additional system analysis, comprising for example real time measurement of phase noise power spectral density and a measure of frequency stability (e.g., an Allan deviation or modified Allan deviation, ADEV).

Figure 4:
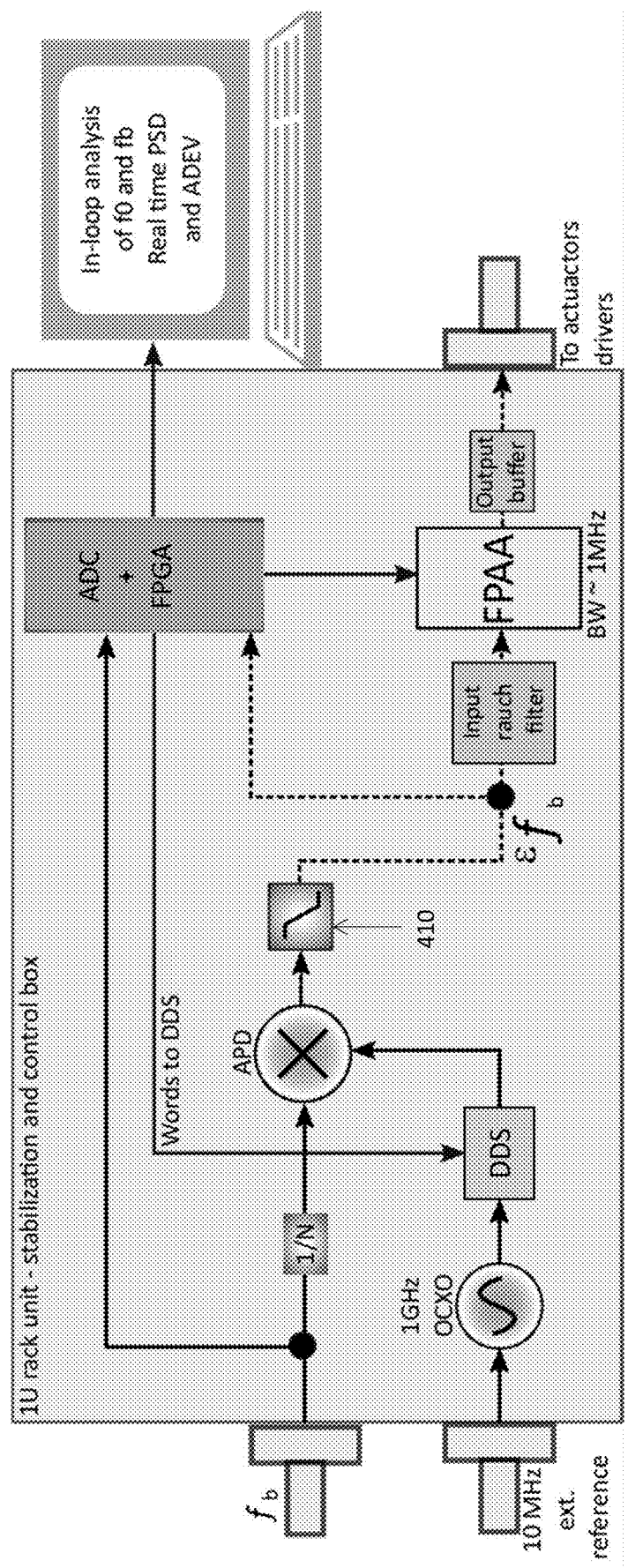
FIG. 4 shows another example embodiment of a hybrid phase locking system for a frequency comb.

FIG. 4 shows a detailed version of an example of the hybrid phase locking system 300. Appropriate beat signals as for example generated with photodetectors are directed to the input of the electronic box. For simplicity, we show only a beat signal $f_b$ as the input; however, more than one input signal can be used, such as $f_0$ as well as additional signals for example as required for the control of a dual comb system. The same architecture can be used for each input signal. In an example implementation, the control box can comprise a 1 U box, however other control box sizes can also be used. The beat signal can be optionally divided by a frequency divider (shown as block 1/N in FIG. 4), which divides the input frequency by a factor of N. The frequency divider is sometimes also referred to as a pre-scaler and can increase the locking range of the actuators that are part of the system. The beat signal is mixed with a local analog oscillator via a mixer (or generally an analog phase detector, APD, as shown in FIG. 4) generating an error signal $\varepsilon f_{beat}$ (depicted as $\varepsilon f_b$ in FIG. 4) related to $f_{beat}$. The APD reduces or minimizes the system noise and increases or maximizes the performance of the PID loop as a charge pump current, as typically required in conjunction with digital phase detectors, is not needed. The local oscillator signals can be generated using a precision oscillator, e.g., a 1 GHz oven-controlled crystal oscillator (OCXO), disciplined to an external 10 MHz reference derived from a GPS signal, for example. Tuning of the local oscillator can be implemented via a conventional direct digital synthesizer (DDS) clocked by the 1 GHz reference signals.

After passing a low pass filter 410 as indicated in FIG. 4, the error signal $\varepsilon f_{beat}$ is then split in two, where one part is directed to an FPGA branch and the other part is directed to an FPAA branch.

To appropriately condition the signal for the FPGA, the beat signal directed to the FPGA branch is digitized via an ADC in this example. To obtain the phase error between the beat signals and the reference from the error signal, the transfer function or conversion factor of the mixer can be used. Moreover to compensate for any gain as used to process the error signal, the open transfer function is calculated (for example from the $f_{beat}$ input signal to the control output signal (as present after the output buffer), see FIG. 4). The FPGA output is directed to appropriate frequency comb actuators (not shown) and used for coarse control of the frequency comb. The PID loop internal to the FPAA reduces or minimizes the phase error. As shown, the FPGA can also receive the $f_{beat}$ signal directly (via appropriate ADCs) for in-loop analysis. For example via calculation of the Fourier transform of the error signals, the in-loop phase noise spectral density, Allan deviation (ADEV), or I-Q diagrams for $f_{beat}$ can be obtained, thereby continuously monitoring the quality of the phase locked loop.

In contrast to the FPGA branch, the FPAA receives the error signal directly, bypassing the FPGA and any ADC to increase or maximize the achievable control bandwidth for fine control of the frequency via the phase locked loop based on its own analog PID loop. The single-ended error signal can be converted into a differential voltage signal through an input buffer, also called a passive Rauch filter, with optimized gain and corner frequency. Those input buffers also can provide a low pass filter function (e.g., two pole) which may be very useful in reducing or minimizing high frequency noise from being aliased into the FPAA. Further, the differential FPAA output voltage can be converted through output buffers. The output buffers can convert the differential output from the FPAA to single-ended, they can step down the FPAA output from VMR (Voltage Mid Rail) to ground, they can amplify or attenuate the signal out of the FPAA, or they can provide a low pass filter function (e.g., one pole) which may be useful for removing clock noise or smoothing the quantization of the output.

In addition, the FPGA can be configured to calculate the open-loop transfer function between the input signals to the control box and the output signals used for controlling the actuators. From this information the required PID parameters of both the FPGA and FPAA can be obtained and optimized, ensuring that the whole system stays locked even in the presence of component or system aging and varying environmental conditions. Apart from ensuring robust operation of the system, the FPGA enables continuous tuning of the PID parameters and reduces or minimizes the phase noise of $f_{beat}$ and overall system noise.

The fast FPAA can remain engaged the whole time; if one or more of the actuators unexpectedly move outside of the locking range of the FPAA due to a major disturbance of the system, it is generally sufficient to change the gain of the PID parameters to prevent the onset of oscillations in the feedback loop. Accordingly, in some embodiments, both the FPAA and the FPGA operate substantially at the same time without interruption.

Appropriate combinations of FPGAs and FPAA for phase locked loops in general and frequency combs in particular may require iterative algorithms for their operation. An example of suitable flow-chart for implementation of such an algorithm is depicted via the example method 500 shown in FIG. 5.

In this example, the system operates in a closed feedback control loop permanently with PID gain parameters Kp, Ki, and Kd (Kp: proportional gain, Ki: integrator gain and Kd: derivative gain) set to 0. The system receives a setpoint called $f_{ref}$. The FPGA reads this setpoint. A frequency counter is implemented with for example a 10 MHz sampling rate and counts the frequency of $f_{beat}$ (shown as $f_b$ in FIG. 5) and compares it to the set point. If the difference between $f_{ref}$ and $f_{beat}$ is not equal to 0, a ramp voltage is applied to the actuator until the difference is 0. The FPGA then sends the command to the FPAA to set all the P, I and D gains to 0 (e.g., resetting the FPAA). The FPGA then increases the proportional gain Kp until the error signal overshoots, and stores the gain Ku, where Ku is the value of Kp at which the system starts to oscillate. The tuning of the proportional gain rule results in a closed control loop giving an overshooting response with a quarter wave decay of the oscillating control variable.

As an alternative or an addition to the PID controller, when a system requires the differentiator to have a high frequency pole, the locking architecture disclosed here is also compatible with the use of a lead-lag compensation scheme. In the case of a first order lead-lag compensator, three parameters can be tuned: a simple zero, a simple pole, and a gain. Using criteria such as the Routh-Hurwitz criterion, the system can set the lead-lag parameters by reducing or minimizing the sum of the squares of errors of phase margin plus gain margin of the compensated system. Those parameters allow the system to dynamically improve or optimize the performance of the loop in terms of steady-state characteristics, the maximum percentage overshoot and undershoot, and settling time.

The FPGA then measures and calculates the sustained oscillations and rapidly or immediately decreases the gain Kp. The FPGA use an algorithm to determine the appropriate gain parameters of the control loop. For example, a self-tuning algorithm such as the Ziegler-Nichols method can be implemented. When the parameters are set, the in-loop frequency is counted with for example a 10 MHz sampling rate time to verify that $f_{beat}$ is still locked to the reference. If not, the algorithm starts back from the beginning. If still locked, an in-loop analysis is then performed in terms of power spectral density of phase noise and a measure of frequency stability (e.g., an Allan deviation (ADEV)), to verify if the lock parameters fit the requirements. If the in-loop error signal is too noisy the gain parameters are empirically adjusted to optimize the control loop. For example, if the gain oscillation is too high, the gain Kp is decreased. If the error signal is not 0 V, the gain Ki is adjusted. The system can then be totally autonomous, regulated and the performance monitored in real-time.

Figure 5:
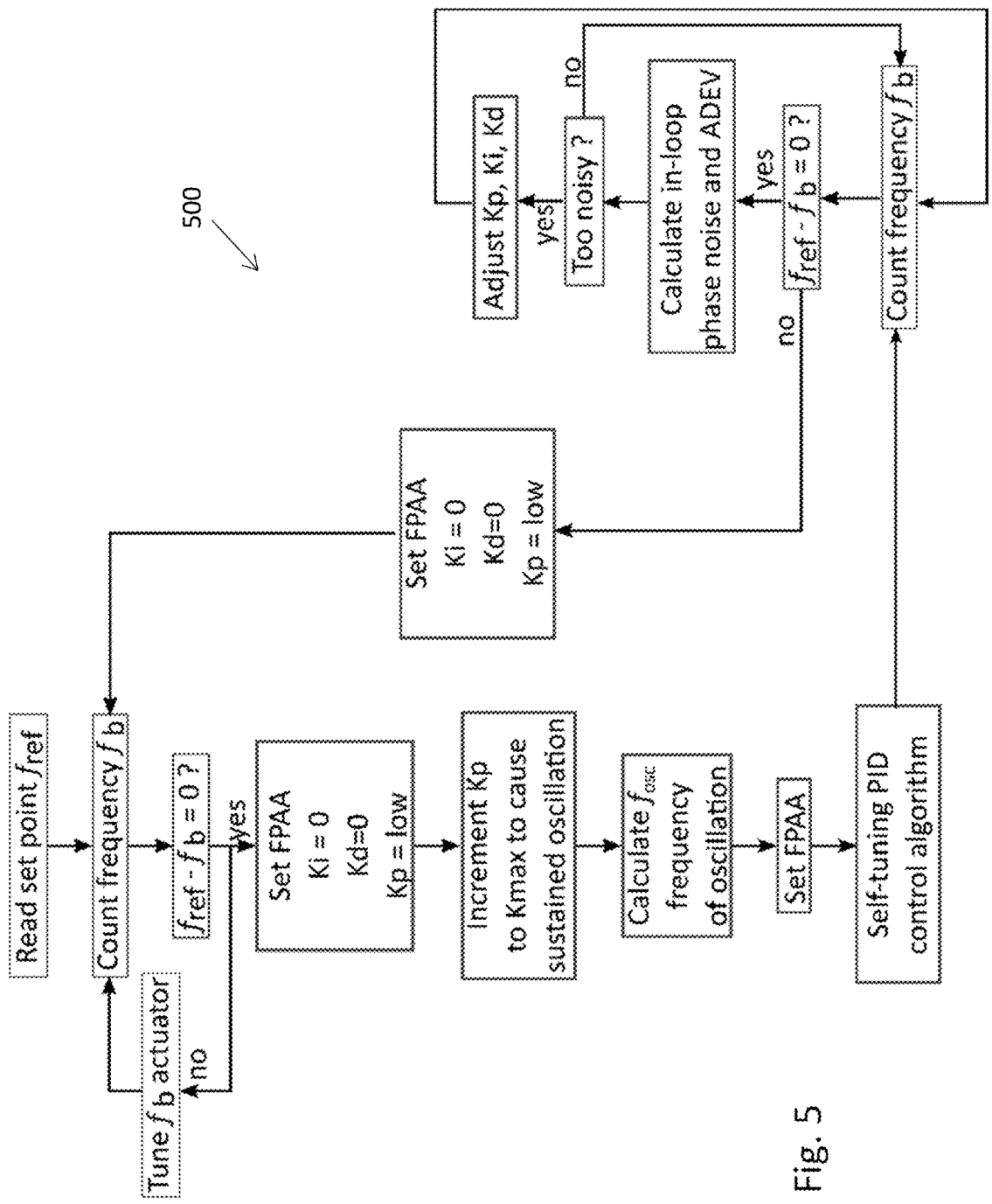
FIG. 5 is a flowchart showing an example control method for hybrid phase locking using both an FPGA and an FPAA.

An example of a specific implementation of the method 500 depicted in FIG. 5 comprises the following actions.

Read set point $f_{ref}$: In some implementations, the set point frequency is user-settable so that the user can choose a frequency to lock the comb on to.

Count frequency $f_{beat}$: The free-running frequency $f_{beat}$ is counted using an implemented reciprocal frequency counter. The resolution of the frequency does not need to be high but generally should be at least 8 digits.

Test if $f_{ref}-f_{beat}=0$: Test if the free running $f_{beat}$ is within the locking range of the FPAA-based fast control.

If this condition is not verified, the method determines the sign with its internal phase detector and tunes the actuator (depending on the sign) until it reaches the condition $f_{ref}-f_{beat}=0$.

Set FPAA: This action closes the loop while keeping an open-loop configuration by setting the gain parameters to 0 (Kp=low, Ki=0, Kd=0), e.g., with Kp close to zero, but not identical to zero.

Increment Kp to Kmax to cause sustained oscillation: Incrementing Kp to Kmax (gain for which the loop oscillates).

Calculate $f_{osc}$ frequency of oscillation: The algorithm measures $f_{osc}$.

Set FPAA: The algorithm is set to a new value. Kp is set at Kmax/2.

Self-tuning PID control algorithm: Use of an algorithm based on self-tuning PID control such as the Ziegler-Nichols method (or other methods such as Tyreus-Luyben, Cohen-Coon, etc.) to determine the gain parameter of the proportional gain, integral gain, and derivative gain.

Count frequency $f_{beat}$: The free-running frequency $f_{beat}$ is counted using an implemented reciprocal frequency counter. The resolution of the frequency does not need to be high but preferably should be at least 8 digits.

If the system is not locked, the gain parameters are set back to 0, and the algorithm starts from the beginning with the tuning of the actuator to bring $f_{beat}$ back in the locking range. If the system is still locked, in-loop diagnosis is performed.

Calculate in-loop phase noise and ADEV: By recording the error signal continuously, in-loop analysis allows the system to verify if the gain parameters are optimized in real-time.

Although examples of control algorithms are described herein in the context of PID controllers, this is for illustration and is not a limitation. In other implementations, other controller architectures can be implemented, for example, a cascaded PID control, simple proportional control, a lead-lag compensator, a model predictive control, a fly-by-wire control. As an example, in some systems Kd is set to 0 so that the PID controller reduces to a PI control scheme. Any variant of a PID controller can be used such as a P, I, D, PI, PD, or ID control scheme. In various implementations, PID control parameters can include one or more of proportional gain (Kp, sometimes called P), integral gain (Ki, sometimes called I), or derivative gain (Kd, sometimes called D) or their variants (e.g., Ki=Kp/Ti or Kd=Kp*Td, where Ti and Td are integral and derivative times).

Embodiments of the control algorithms or methods described herein as well as with reference to FIG. 5 can be implemented as executable computer instructions that are stored in non-transitory storage (e.g., random access memory, read only memory, semiconductor memory, on-chip memory, etc.). The executable computer instructions, when executed by a hardware processor, can perform the control algorithms and methods. In certain implementations, the FPGA or the FPAA can comprise the non-transitory storage, which stores the executable computer instructions implementing the control algorithms or methods.

FIG. 6A shows an example system 600 for measuring the in-loop phase noise of $f_{beat}'=f_{beat}-f_0$ when phase locking a fiber frequency comb with an embodiment of the present hybrid phase locking scheme. In FIG. 6A, the frequency $f_0$ of the comb generated by the femtosecond oscillator is measured with an f-2f interferometer, and $f_0$ is mixed with a beat signal $f_{beat}$ between a reference laser 605 and the m-th comb line from the frequency comb to generate an offset-frequency free RF beat signal $f_{beat}'=V_{RIO}-m\times f_{rep}$, as shown in FIG. 6A. Here $V_{RIO}$ is the frequency of the reference laser. The reference laser can include a single mode cw laser with a linewidth <10 MHz, e.g., as available from Redfern Integrated Optics (RIO). The RF signal $f_{beat}'$ is then mixed with a frequency synthesizer derived from a reference clock, e.g., a 10 MHz rubidium clock in the example of FIG. 6A. The output of the mixer is an error signal $\varepsilon f_{beat}'$. The error signal $\varepsilon f_{beat}'$ is then directed to the FPAA-based PID controller. The fast output of the FPAA goes to an intracavity electro-optic modulator (EOM) with a bandwidth of more than 100 kHz. This feedback signal is integrated and sent to a piezoelectric transducer (PZT) inside the femtosecond oscillator to provide long-term operation and robustness.

The phase noise power spectral density (PSD) of $f_{beat}'$ can be further analyzed using well known procedures. In one experimental setup, the in-loop phase noise exhibits a flicker phase noise floor at the level of $2\times 10^{-10}$ 1/f rad$^2$/Hz (see FIG. 6B). For comparison a similar set-up was also used in conjunction with analog conventional servo-locking and FPGA (digital) locking and the results are plotted in FIG. 6B revealing that the FPAA technology is extremely competitive in term of additive noise. The obtained phase noise spectral densities of $f_{beat}'$ corresponding to an FPGA lock, a conventional analog lock, and an FPAA locking architecture are respectively represented by the curves 620, 622, and 624 in FIG. 6B. Clearly, FPAA based phase locking produces almost the same phase noise as analog phase locking (above about 100 Hz) and produces phase noise that is significantly below analog phase locking noise at lower frequencies (below about 100 Hz) and is above the FPAA flicker phase noise floor. The PSD for the hybrid phase locking scheme can be >40 dB lower than achievable with FPGA based phase locking architectures.

Examples of the calculated in loop Allan deviation (upper curve) and modified Allan deviation (MAD; lower curve) calculated from $f_{beat}'$ are further shown in FIG. 6C. The MAD can reach a fractional frequency stability of around $10^{-18}$ in 1 sec when averaging on τ.

Figure 7:
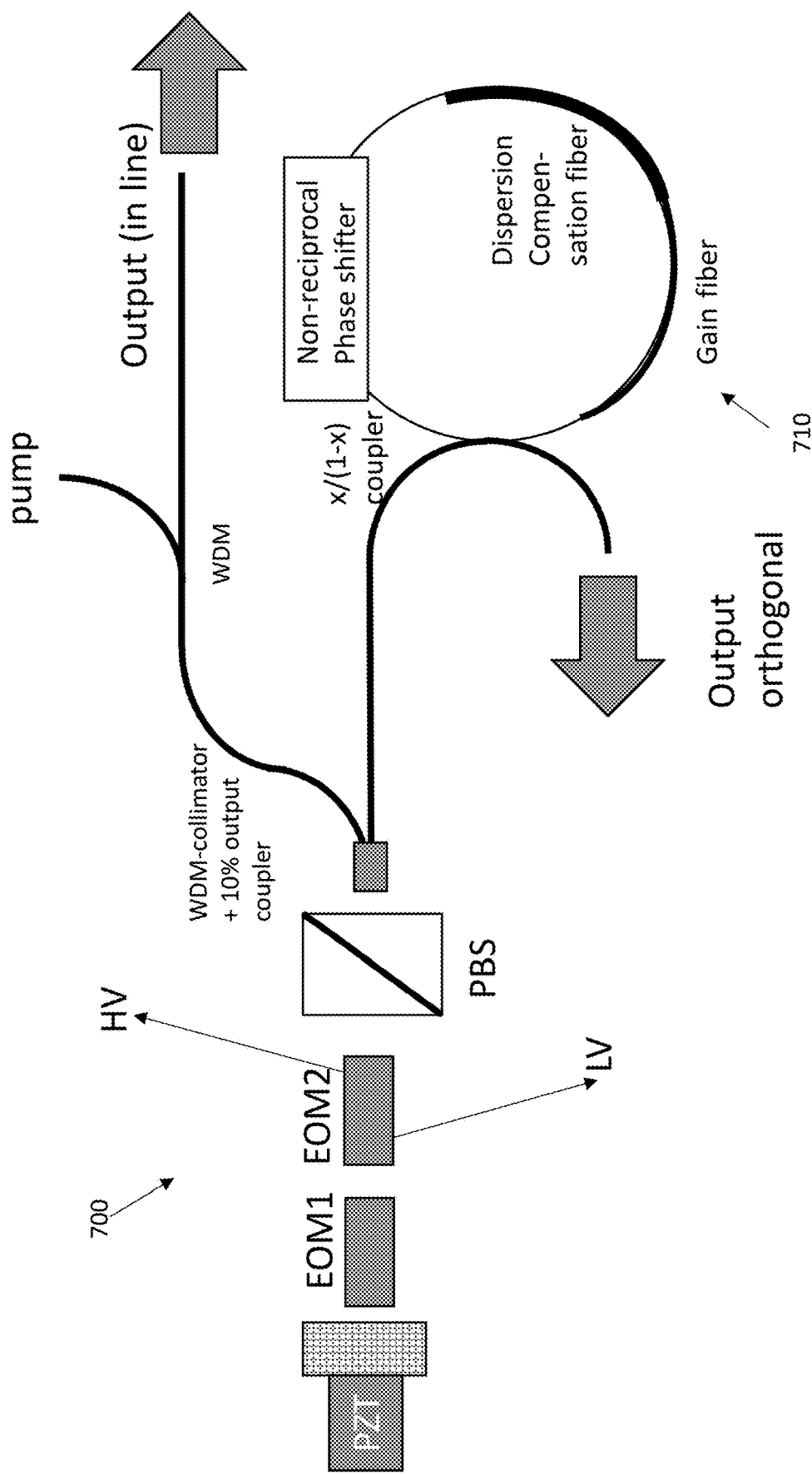
FIG. 7 shows an example embodiment of a low noise fiber frequency comb.

FIG. 7 shows an example of a fiber frequency comb 700, which can be precision controlled using embodiments of the control systems described herein. As shown in FIG. 7, an appropriate fiber-based comb can be based on a passively modelocked fiber laser incorporating a nonlinear amplifying loop mirror (NALM) 710 as for example disclosed in U.S. Patent Publication No. 2016/0248217 to Fermann, which is hereby incorporated by reference herein in its entirety. To take advantage of the fast feedback bandwidth enabled by a hybrid phase locking architecture, large bandwidth intra-cavity modulators can be incorporated. In FIG. 7, the inclusion of a first electro-optic modulator (EOM1) for repetition rate control with a feedback bandwidth >500 kHz is shown. Also shown is a second electro-optic modulator (EOM2) for large bandwidth $f_{ceo}$ control via intra-cavity loss modulation. Intra-cavity loss modulation via intra-cavity modulators is for example disclosed in U.S. Pat. Nos. 8,792,525 and 9,698,559, both to Fermann et al., each of which is hereby incorporated by reference herein in its entirety.

For amplitude noise control, and as further described in the '525 patent, an output of the frequency comb can be detected with a detector and converted to an RF signal at the laser repetition rate or one of its harmonics. An intra-cavity loss modulator (e.g., EOM1, EOM2, or another EOM) can be used to stabilize the output power of the fiber comb laser via an electronic feedback loop connected to the intra-cavity loss modulator, thus reducing or minimizing amplitude fluctuations of the laser and reducing or minimizing the phase noise of the microwave source. Because of the large possible modulation bandwidth with an intra-cavity loss modulator, amplitude noise minimization via an intra-cavity loss modulator can be much more effective compared to pump power control. As an example, in FIG. 7, EOM2 can be configured for amplitude noise control.

Since in typical frequency comb systems substantial adjustments of the $f_{ceo}$ frequency of the order of the frequency comb spacing are often required, relatively high voltages may be needed to obtain a substantial modification of the intra-cavity loss with typical electro-optic modulators. Such high voltage supplies can have limited bandwidth. Therefore, in the example laser system 700 as shown in FIG. 7, a high voltage (HV) for relatively low bandwidth $f_{ceo}$ frequency modulation is applied to one of the two electrodes of the electro-optic modulator (EOM2), whereas a lower voltage (LV) for high bandwidth $f_{ceo}$ frequency modulation is applied to the second of the two electrodes of the electro-optic modulator (EOM2). In an example embodiment, HV can be greater than 250 V or larger than 500 V, whereas LV can be a factor of 5 to 10 smaller than HV. In various implementations, the HV supply can be configured to allow for a modulation bandwidth up to around 1 kHz to 20 kHz, whereas the LV supply can be configured to allow for a modulation bandwidth up to around 40 kHz to 1 MHz and even higher, depending on the exact system configuration. In some implementations, the LV modulation bandwidth can be a factor of 5 to 10 higher than the HV modulation bandwidth. These two voltages add inside EOM2, and an advantage of such a configuration is that both fast and slow $f_{ceo}$ control can be provided with one actuator. In an example embodiment, the FPGA can control the HV, and the FPGA in conjunction with the FPAA can control the LV.

The NALM 710 in the system 700 can include a gain fiber (e.g., rare-earth doped, and which may be asymmetrically located in the loop), an optional dispersion compensating fiber, and a non-reciprocal phase shifter (which may provide an appropriate phase bias for the NALM). The system 700 can include a piezo-electric transducer (PZT) for repetition rate control, a fiber coupler with a selectable splitting ratio x/(1−x), and an optical pump source. A polarization beam-splitter (PBS) for selecting a single polarization and a fiber collimator (e.g., a wavelength division multiplexer WDM) including a beam-splitter for output coupling can also be included. The laser configuration shown in FIG. 7 is also shown as an example, and other laser systems can be equally used in conjunction with hybrid phase locking architectures.

Figure 8A:
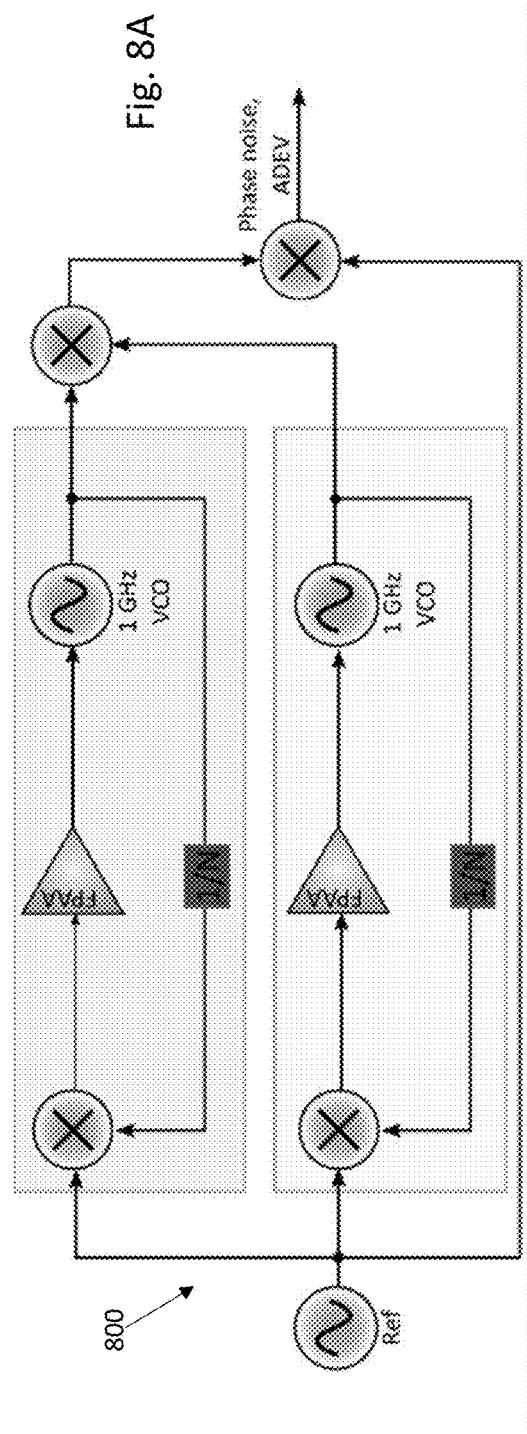
FIG. 8A shows an example experimental system to measure the residual phase noise of an FPAA in closed loop operation.
Figure 8C:
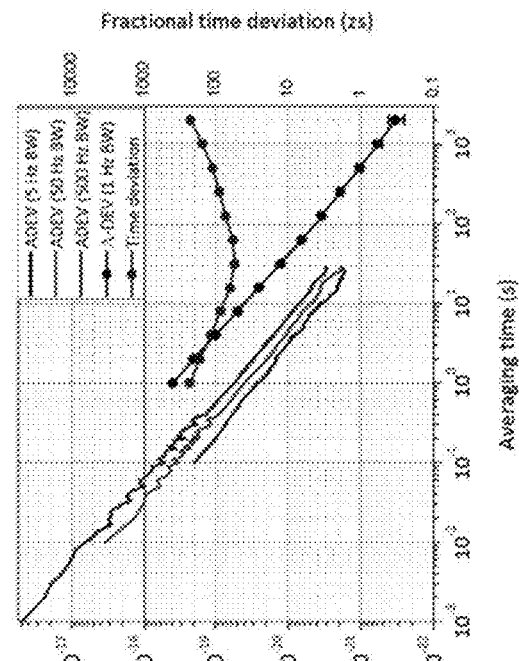
FIG. 8C shows an example of the fractional instability and time deviation of an optical reference frequency of an FPAA-based phase locking architecture.
Figure 8B:
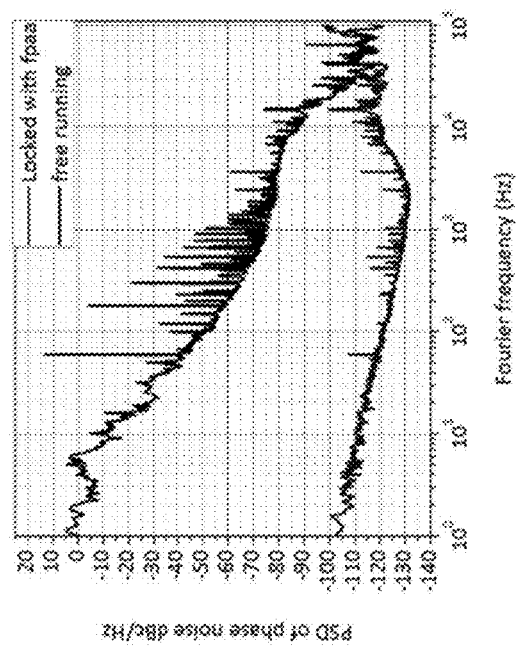
FIG. 8B shows an example of the in-loop flicker phase noise of an FPAA based phase locking architecture, with the upper curve showing free running and the lower curve showing locked with the FPAA.

FIG. 8A shows an experimental system 800 configured to measure the residual phase noise of an FPAA in closed loop operation. Two VCOs operating at 1 GHz are phase-locked to a common reference (Ref, in this case a rubidium clock) within a 100 kHz bandwidth (modulation bandwidth of the VCO) via mixing the outputs of the VCOs with the reference in the mixer upstream of the two FPAAs and directing the resulting error signals to the respective FPAAs. The rubidium clock is also used to clock the FPAA (not shown). A frequency divider (1/N) is also implemented between the VCO outputs and the mixers upstream of the FPAAs. The two VCO outputs are then mixed together and this signal is compared to the reference to isolate the noise of the FPAA itself. The phase noise power spectral density (PSD) of the residual phase noise of the FPAA is shown in FIG. 8B (with the upper curve showing free running, and the lower curve showing the system locked with an FPAA). The corresponding Allan deviations are shown in FIG. 8C. As evident from FIG. 8B (lower curve, where the system is locked with the FPAA), the FPAA exhibits a flicker phase noise floor at −105 dBc/Hz 1/f at low Fourier frequency (1 Hz to 1 kHz) and is limited by the gain of the loop and the free-running noise of the VCO at higher frequencies. The flicker phase noise floor scaled to an optical frequency exhibits a stability of $5 \times 10^{-19}$ in 1 sec averaging on τ, as evident from the Allan deviation measurements shown in FIG. 8C. The time deviation after 1000 s is 150 zeptosecond (zs). In FIG. 8C, standard conversions between phase noise and frequency stability as well as time deviation were used.

Figure 8D:
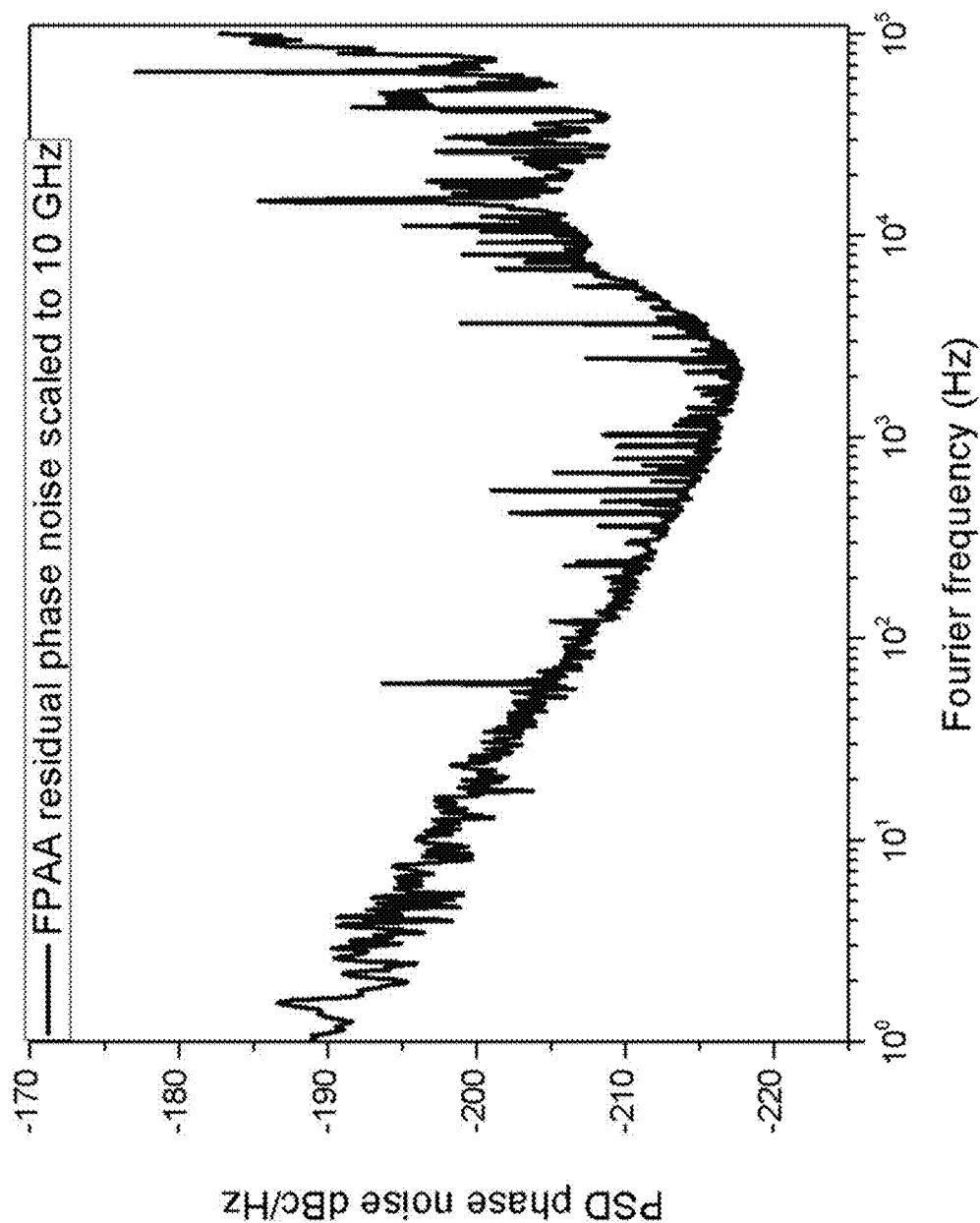
FIG. 8D shows an example of the in-loop flicker phase noise of an FPAA-based phase locking architecture when scaled to a frequency of 10 GHz.

Embodiments of the hybrid phase locking architecture can support ultra-low phase noise microwave generation from a frequency comb via optical frequency division from the optical to the RF domain, for example via phase locking of a frequency comb to an ultra-high Q-cavity or a reference fiber length and detection of the repetition rate of the frequency comb or a harmonic of the repetition rate. The reference fiber length can comprise a standard telecommunications fiber or a hollow core fiber, such as a photonic bandgap fiber for the optimization of the achievable phase noise. Such schemes can be implemented similarly to those, for example, described in U.S. Pat. No. 9,166,361 to Hartl et al. However, because of the high demand on precision phase locking, to date such schemes rely on bulky and cumbersome analog locking electronics. That a hybrid phase locking scheme as disclosed here can indeed be used for the generation of low phase noise microwaves is further demonstrated in FIG. 8D, which shows the residual phase noise of the hybrid phase-locked loop architecture when scaled to 10 GHz. A PSD of −186 dBc/Hz and −216 dBc/Hz at 1 Hz and 1 kHz were verified experimentally, which is more than adequate for the support of state-of-the-art ultra-low phase noise microwave generation systems, where the requirement for phase noise is of the order of <−165 dBc/Hz in order to be competitive with conventional microwave generation via electronic oscillators. As seen in FIG. 8D, at higher offset frequencies, the phase noise increases, but this increase depends to a large extent on limitations of the laser architecture itself and can be improved with optimal laser designs.

As compared to a conventional digital phase locked loop, embodiments of the present systems can be attractive for any low noise applications including feedback loops, as the error signal is not digitized, and the use of an analog mixer to generate the error signal is possible. Moreover, the use of a charge pump current is not needed, reducing or minimizing loop noise. The 1/f noise of the FPAA is the ultimate limitation of such a servo-locking. The 1/f noise of typical FPAA phase locking architectures was for example measured and shown in FIG. 8B.

Embodiments of the disclosed servo-locking architecture can support a feedback bandwidth >100 kHz, >500 kHz, >1 MHz, >2 MHz and even higher. The servo-locking architecture can therefore support very high bandwidth actuators such as EOMs, acousto-optic modulators, graphene and electro-absorption modulators. Moreover, the present hybrid phase locking scheme can be used to modulate the cavity loss with bandwidths exceeding >100 kHz, >500 kHz, >1 MHz, >2 MHz and even higher in modelocked laser oscillators, thereby allowing for control of the modelocked laser $f_{ceo}$ limited only by the photon life-time of the oscillator. Embodiments of the hybrid servo-locking architecture can also be used for the suppression of the phase noise of VCOs operating in the microwave domain or OEOs and coupled OEOs via appropriate high bandwidth feedback.

For the special case of high bandwidth control of a frequency comb, embodiments of the hybrid phase locking schemes can be used to reduce or minimize the phase noise of relatively noisy frequency combs which have a free running $f_{ceo}$ linewidth of 1 MHz or a few MHz via appropriate high bandwidth actuators. In order to generate a frequency comb with very low phase noise for $f_{ceo}$ and $f_{beat}$ with certain embodiments of the hybrid phase locking architecture as disclosed here, the free running $f_{ceo}$ bandwidth of the frequency comb should be <300 kHz and preferably <100 kHz and most preferably <50 kHz. More generally, in order to generate a frequency comb with very low phase noise for $f_{ceo}$ and $f_{beat}$, the free running $f_{ceo}$ linewidth should preferably be smaller than the maximum feedback bandwidth of the relevant actuators in combination with the FPAA phase locking architecture.

Embodiments of the hybrid phase locking architecture as disclosed here can be used for low phase noise microwave generation via optical frequency division producing a phase noise power spectral density level of <−150 dBc/Hz at offset frequencies of 10 kHz and 100 kHz at a microwave frequency of 10 GHz. A phase noise at 10 GHz of <−160 dBc/Hz and even <−170 dBc/Hz is reachable at an offset frequency of 100 kHz. The achievable phase noise power at a microwave frequency F (e.g., F=10 GHz) scales with $1/F^2$, therefore at a frequency of 3 GHz, the phase noise can in principle be a factor of 11.1 (=10.46 dB) lower. Generally, the achievable phase noise power $\Phi$ compared to the phase noise power at 10 GHz, $\Phi(10\ GHz)$ scales (in dB) with carrier frequency F as $\Phi(F)=\Phi(10\ GHz)+20*\log(F/F_0)$, where $F_0$=10 GHz.

Embodiments of the hybrid phase locking architecture as disclosed here can also be used for the reduction of the phase noise of VCOs, OEOs and coupled OEOs at offset frequencies >100 kHz in a compact form factor. Further, embodiments of the hybrid phase locking architecture as disclosed here can also be used for frequency locking of two cw lasers to each other with a feedback bandwidth >100 kHz via the use of an imbalanced fiber interferometer as a frequency discriminator, for example as described in U.S. Patent Application No. 62/462,591, filed Feb. 23, 2017, or in U.S. patent application Ser. No. 15/901,186, or in international patent publication no. WO 2018/044500, all of which are hereby incorporated by reference herein in their entireties.

Additional Aspects

In a first aspect, a control system for feedback control of at least one parameter of a laser system comprising: an analog proportional-integral-derivative (PID) based feedback loop (analog PID), said analog PID configured with an analog control loop; a digital proportional-integral-derivative (PID) based feedback loop (digital PID), said digital PID configured in a digital control architecture; wherein PID parameters in said analog control loop are configured in response to one or more signals generated with said digital control architecture.

In a second aspect, a control system according to aspect 1, said analog PID configured in a field programmable analog array (FPAA) architecture.

In the third aspect, a control system according to aspect 1 or aspect 2, said digital PID configured in a field programmable gate array (FPGA) architecture.

In a fourth aspect, a control system according to any one of aspects 1 to 3, said analog PID configured with a higher feedback bandwidth than said digital PID.

In a fifth aspect, a control system according to any one of aspects 1 to 4, wherein an output of said analog PID is fed to an input of the digital PID.

In a sixth aspect, a control system according to any one of aspects 1 to 5, wherein said laser system comprises a frequency comb laser.

In a seventh aspect, a control system according to aspect 6, wherein said analog PID feedback loop includes an actuator for control of a beat frequency of said frequency comb laser with an external reference laser.

In an eighth aspect, a control system according to aspect 6 or aspect 7, wherein said frequency comb laser is configured for low phase noise generation at a carrier frequency F via optical frequency division, said frequency comb laser producing a single-sided phase noise spectral density <−150+20*log(F/F_0) dBc/Hz, where $F_0$=10 GHz, anywhere in an offset frequency range from 10 kHz to 100 kHz.

In a ninth aspect, a control system according to aspect 6 or aspect 7, wherein said frequency comb laser is configured for low phase noise generation at a carrier frequency F via optical frequency division, said frequency comb laser producing a single-sided phase noise spectral density <−160+20*log(F/F_0) dBc/Hz, where $F_0$=10 GHz, anywhere in an offset frequency range from 10 kHz to 100 kHz.

In a 10th aspect, a control system according to any one of aspects 6 to 9, wherein said analog PID feedback loop includes an actuator for control of the carrier envelope offset frequency ($f_{ceo}$) of said frequency comb laser, and said analog PID has a control bandwidth larger than a free running $f_{ceo}$ linewidth of said frequency comb laser.

In an 11th aspect, a control system according to any one of aspects 1 to 10, wherein said analog control loop comprises an electro-optic modulator.

In a 12th aspect, a control system according any one of aspects 1 to 11, wherein said laser system comprises a frequency comb laser configured for optical clock applications.

In a 13th aspect, a control system according to any one of aspects 1 to 12, wherein said laser system comprises an opto-electronic oscillator (OEO) or coupled OEO.

In a 14th aspect, a control system according to any one of aspects 1 to 13, where said control system is configured to lock a frequency comb to a cw laser or a cw laser to an optical cavity.

In a 15th aspect, a control system according to any one of aspects 1 to 14, said laser system comprising a dual comb or a triple comb laser system.

In a 16th aspect, a control system according to any one of aspects 1 to 15, said digital PID configured to receive a digital signal as input.

In a 17th aspect, a control system according to any one of aspects 1 to 16, said digital PID configured to receive an analog signal as input, said digital PIC comprising an analog-to-digital converter (ADC).

In an 18th aspect, a control system according to any one of aspects 1 to 17, further comprising at least one actuator controlling said laser system.

In a 19th aspect, a control system according to aspect 18, wherein said at least one actuator comprises an electro-optic modulator, an acousto-optic modulator, a graphene modulator, an electro-absorption modulator, or a piezoelectric transducer.

In a 20th aspect, a control system according to any one of aspects 1 to 19, further comprising at least two actuators controlling said laser system.

In a 21st aspect, a control system according to any one of aspects 1 to 20, wherein said analog PID and said digital PID are configured to operate substantially at the same time without interruption.

In a 22nd aspect, a control system according to any one of aspects 1 to 21, wherein said analog and said digital PID are configured to operate substantially at the same time without interruption, even when an actuator controlling said laser system is outside a locking range of said analog PID.

In a 23rd aspect, a control system according to any one of aspects 1 to 22, further comprising a Rauch filter.

In a 24th aspect, a frequency comb source comprising: an electro-optic modulator for intra-cavity loss modulation; said electro-optic modulator comprising a first electrode and a second electrode, each of said first electrode and second electrode referenced to ground, where in absolute terms the first electrode receives a first voltage that is lower compared to a second voltage applied to the second electrode; and a first modulation bandwidth of said first electrode voltage is configured to be higher than a second modulation bandwidth of said second electrode voltage.

In the 25th aspect, a frequency comb source according to aspect 24, where a ratio of the second voltage over the first voltage is greater than 5 or the ratio of the first modulation bandwidth over the second modulation bandwidth is greater than 5.

In the 26th aspect, a frequency comb source according to aspect 24 or aspect 25, where the second voltage is greater than 500 V in absolute terms.

In the 27th aspect, a frequency comb source according to aspect 24 or aspect 25, where the second voltage is greater than 250 V in absolute terms.

In the 28th aspect, a frequency comb source according to any one of aspects 24 to 27, wherein said electro-optic modulator is configured for $f_{ceo}$ control of said frequency comb source.

In the 29th aspect, a frequency comb source according to any one of aspects 24 to 28, wherein said electro-optic modulator is configured for amplitude noise control of said frequency comb source.

In a 30th aspect, a control system for control of at least one parameter of a laser system, the control system comprising: a first proportional-integral-derivative (PID) based feedback loop comprising a field programmable analog array (FPAA); and a second PID based feedback loop comprising a field programmable gate array (FPGA), wherein the FPGA is configured to control a PID parameter of the FPAA.

In the 31st aspect, a control system according to aspect 30, wherein said first PID based feedback loop is configured for a higher feedback loop bandwidth than the second PID based feedback loop, and wherein an output of said first PID based feedback loop is injected into said second PID based feedback loop.

In a 32nd aspect, a control system according to any one of aspects 30 or 31, said FPAA, said FPGA, or both said FPAA and said FPGA configured to control more than one PID.

In a 33rd aspect, a control system according to any one of aspects 30 to 32, further comprising a cascaded PID based feedback loop, wherein an output of a faster PID is injected into an input of a slower PID.

In a 34th aspect, a control system according to any one of aspects 30 to 33, wherein the FPGA is configured to continuously optimize the PID parameter of said FPAA based PID loop.

In a 35th aspect, a control system according to any one of aspects 30 to 34, further comprising additional FPAA or FGPA based feedback loops for controlling additional parameters of said laser system.

In a 36th aspect, a method for control of at least one parameter of a laser system, the method comprising: under control of a control system comprising a first proportional-integral-derivative (PID) based feedback loop comprising a field programmable analog array (FPAA), and a second PID based feedback loop comprising a field programmable gate array (FPGA), controlling, by the FPGA, a PID parameter of the FPAA.

In the 37th aspect, a method according to aspect 36, wherein said first PID based feedback loop is configured for a higher feedback loop bandwidth than the second PID based feedback loop, and said method comprises: injecting an output of said first PID based feedback loop into said second PID based feedback loop.

In the 38th aspect, non-transitory computer storage configured with computer-executable instructions that when executed by a processor cause the processor to execute a self-tuning algorithm for control of at least one parameter of a laser system via a proportional-integral-derivative (PID) controller, said algorithm comprising: automatically generating tuning parameters of the PID controller; bringing the laser system to a chosen set-point; increasing a P parameter of the PID controller to a set of level until sufficient data has been received to quantify a transfer function of the controller; and setting a range of suitable P, I, and D tuning parameters.

In a 39th aspect, the non-transitory computer storage according to aspect 38, wherein the algorithm further comprises producing a desired closed-loop transfer function after the controller is turned on.

In a 40th aspect, the non-transitory computer storage according to aspect 38 or aspect 39, wherein the algorithm further comprises tuning an additional controller architecture, the additional controller architecture optionally comprising a lead-lag compensator.

In a 41st aspect, non-transitory computer storage configured with computer-executable instructions that when executed by a processor cause the processor to execute an algorithm for the control of at least one parameter of a laser system via a first proportional-integral-derivative (PID) based feedback loop and a second PID based feedback loop, said first PID based feedback loop configured in an field programmable analog array (FPAA) and said second PID based feedback loop configured in a field programmable gate array (FPGA), said algorithm comprising: adjusting, by said FPGA, said at least one parameter into a desired range, adjusting, by said FPAA, I and D parameters of said first PID based feedback loop to zero; increasing, by said FPAA, a corresponding P parameter to a set of levels until sufficient data is available to quantify a transfer function of the FPAA architecture; and determining an optimized set of P, I and D tuning parameters from said data to ensure stable, low noise operation of said laser system with said at least one parameter set to a desired value.

In a 42nd aspect, non-transitory computer storage configured with computer-executable instructions that when executed by a processor cause the processor to execute an algorithm for the control of at least one parameter of a laser system via at least a first lead-lag compensator and a second lead-lag compensator, said first lead-lag compensator configured in a field programmable analog array (FPAA) architecture and said second lead-lag compensator configured in a field programmable gate array (FPGA) architecture, said algorithm comprising: adjusting, by said FPGA architecture, said at least one parameter into a desired range; and adjusting, by said FPAA architecture, a simple zero, a simple pole, and a gain of the first compensator.

In a 43rd aspect, a control system for feedback control of a microwave oscillator, said control system comprising: a feedback control comprising a field programmable analog array (FPAA) based control loop, said feedback control configured to reduce phase noise of said microwave oscillator based at least in part on an error signal related to phase noise of said microwave oscillator.

In a 44th aspect, a control system for feedback control of a laser system, said laser system comprising a high actuation bandwidth actuator and a low actuation bandwidth actuator, said control system comprising: a hybrid phase locking system comprising an analog control loop and a digital control loop; said digital control loop configured to control the low actuation bandwidth actuator; said analog control loop configured to control the high actuation bandwidth actuator based at least in part on a set of control parameters; and said digital control loop configured to control autonomously the set of control parameters of the analog control loop.

In a 45th aspect, a control system for feedback control of a laser system according to aspect 44, wherein the control parameters comprise proportional-integral-derivative (PID) parameters.

In a 46th aspect, a control system for feedback control of a laser system according to aspect 44 or aspect 45, wherein said digital control loop comprises a field programmable gate array (FPGA).

In a 47th aspect, a control system for feedback control of a laser system according to any one of aspects 44 to 46, wherein said analog control loop comprises a field programmable analogy array (FPAA).

In a 48th aspect, a control system for feedback control of a laser system according to any one of aspects 44 to 47, wherein said digital control loop comprises an FPGA and said analog control loop comprises an FPAA.

In a 49th aspect, a control system for feedback control of a laser system according to any one of aspects 44 to 48, wherein said laser system comprises a frequency comb laser.

In a 50th aspect, a control system for feedback control of a laser system according to any one of aspects 44 to 49, wherein said frequency comb laser is configured for low phase noise generation at a carrier frequency F via optical frequency division, said frequency comb laser producing a single-sided phase noise spectral density $<-150+20*\log(F/F_0)$ dBc/Hz, where $F_0=10$ GHz, anywhere in an offset frequency range from 10 kHz to 100 kHz.

In a 51st aspect, a control system for feedback control of a laser system according to any one of aspects 44 to 50, wherein said frequency comb laser is configured for low phase noise generation at a carrier frequency F via optical frequency division, said frequency comb laser producing a single-sided phase noise spectral density $<-160+20*\log(F/F_0)$ dBc/Hz, where $F_0=10$ GHz, anywhere in an offset frequency range from 10 kHz to 100 kHz.

In a 52nd aspect, a control system for feedback control of a laser system according to any one of aspects 44 to 51, wherein said laser system comprises a frequency comb laser, and said high bandwidth actuator has an actuation bandwidth larger than a free running $f_{ceo}$ linewidth of said frequency comb laser.

In a 53rd aspect, a control system for feedback control of a laser system according to any one of aspects 44 to 52, said high bandwidth actuator comprising an electro-optic modulator.

In a 54th aspect, a control system for feedback control of a laser system according to any one of aspects 44 to 53, wherein said laser system comprises a frequency comb laser configured for optical clock applications.

In a 55th aspect, a control system for feedback control of a laser system according to any one of aspects 44 to 54, wherein said laser system comprises an opto-electronic oscillator (OEO) or coupled OEO.

In a 56th aspect, a control system for feedback control of a laser system according to any one of aspects 44 to 55, where said control system is used to lock a cw laser to a frequency comb or a cw laser to an optical cavity.

In a 57th aspect, a control system for feedback control of a laser system according to any one of aspects 44 to 56, said laser system comprising a dual comb or a triple comb laser system.

In a 58th aspect, a method for control of at least one parameter of a laser system, the method comprising: under control of a control system comprising a proportional-integral-derivative (PID) based feedback loop comprising a field programmable analog array (FPAA), controlling a PID parameter of the FPAA.

In a 59th aspect, a method for control of at least one parameter of a laser system, the method comprising: under control of a control system comprising a first proportional-integral-derivative (PID) based feedback loop comprising a first field programmable analog array (FPAA) and further comprising a second proportional-integral-derivative (PID) based feedback loop comprising a second field programmable analog array (FPAA), controlling, by the first FPAA, a PID parameter of the second FPAA.

In any of aspects 1 to 59, the laser system can comprise a fiber laser or a frequency comb or an OEO or a VCO.

Additional Information

Thus, the invention has been described in several non-limiting embodiments. It is to be understood that the embodiments are not mutually exclusive, and elements described in connection with one embodiment may be combined with, rearranged, or eliminated from, other embodiments in suitable ways to accomplish desired design objectives. No single feature or group of features is necessary or required for each embodiment.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A control system for feedback control of at least one parameter of a laser system comprising:
    an analog proportional-integral-derivative (PID) based feedback loop (analog PID), said analog PID configured with an analog control loop;
    a digital proportional-integral-derivative (PID) based feedback loop (digital PID), said digital PID configured in a digital control architecture;
    wherein PID parameters in said analog control loop are configured in response to one or more signals generated with said digital control architecture.

2. The control system according to claim 1, said analog PID configured in a field programmable analog array (FPAA) architecture.

3. The control system according to claim 1, said digital PID configured in a field programmable gate array (FPGA) architecture.

4. The control system according to claim 1, wherein an output of said analog PID is fed to an input of the digital PID.

5. The control system according to claim 1, wherein said laser system comprises a frequency comb laser.

6. The control system according to claim 5, wherein said analog PID feedback loop includes an actuator for control of a beat frequency of said frequency comb laser with an external reference laser.

7. The control system according to claim 5, wherein said frequency comb laser is configured for low phase noise generation at a carrier frequency F via optical frequency division, said frequency comb laser producing a single-sided phase noise spectral density $<-150+20*\log(F/F_0)$ dBc/Hz, where $F_0=10$ GHz, anywhere in an offset frequency range from 10 kHz to 100 kHz.

8. The control system according to claim 5, wherein said frequency comb laser is configured for low phase noise generation at a carrier frequency F via optical frequency division, said frequency comb laser producing a single-sided phase noise spectral density $<-160+20*\log(F/F_0)$ dBc/Hz, where $F_0=10$ GHz, anywhere in an offset frequency range from 10 kHz to 100 kHz.

9. The control system according to claim 5, wherein said analog PID feedback loop includes an actuator for control of the carrier envelope offset frequency ($f_{ceo}$) of said frequency comb laser, and said analog PID has a control bandwidth larger than a free running $f_{ceo}$ linewidth of said frequency comb laser.

10. The control system according to claim 1, wherein said analog control loop comprises an electro-optic modulator.

11. The control system according claim 1, wherein said laser system comprises a frequency comb laser configured for optical clock applications.

12. The control system according to claim 1, said laser system comprising a dual comb or a triple comb laser system.

13. The control system according to claim 1, further comprising at least one actuator controlling said laser system.

14. The control system according to claim 13, wherein said at least one actuator comprises an electro-optic modulator, an acousto-optic modulator, a graphene modulator, an electro-absorption modulator, or a piezoelectric transducer.

15. The control system according to claim 1, further comprising at least two actuators controlling said laser system.

16. The control system according to claim 1, wherein said analog PID and said digital PID are configured to operate substantially at the same time without interruption.

17. The control system according to claim 1, wherein said analog and said digital PID are configured to operate substantially at the same time without interruption, even when an actuator controlling said laser system is outside a locking range of said analog PID.

18. The control system according to claim 1, further comprising a Rauch filter.

19. A frequency comb source comprising:
an electro-optic modulator for intra-cavity loss modulation;
said electro-optic modulator comprising a first electrode and a second electrode,
each of said first electrode and second electrode referenced to ground,
where in absolute terms the first electrode receives a first voltage that is lower compared to a second voltage applied to the second electrode; and
a first modulation bandwidth of said first electrode voltage is configured to be higher than a second modulation bandwidth of said second electrode voltage.

20. The frequency comb source according to claim 19, where a ratio of the second voltage over the first voltage is greater than 5 or the ratio of the first modulation bandwidth over the second modulation bandwidth is greater than 5.

21. The frequency comb source according to claim 19, where the second voltage is greater than 250 V in absolute terms.

22. The frequency comb source according to claim 19, wherein said electro-optic modulator is configured for $f_{ceo}$ control of said frequency comb source.

23. A control system for control of at least one parameter of a laser system, the control system comprising:
a first proportional-integral-derivative (PID) based feedback loop comprising a field programmable analog array (FPAA); and
a second PID based feedback loop comprising a field programmable gate array (FPGA),
wherein the FPGA is configured to control a PID parameter of the FPAA.

* * * * *

UNITED STATES PATENT AND TRADEMARK OFFICE
CERTIFICATE OF CORRECTION

PATENT NO. : 11,025,027 B2  
APPLICATION NO. : 16/576371  
DATED : June 1, 2021  
INVENTOR(S) : Rolland et al.

Page 1 of 1

It is certified that error appears in the above-identified patent and that said Letters Patent is hereby corrected as shown below:

In the Drawings

On Sheet 4 of 9, FIG. 4, Line 10 (Approx.), delete "actuactors" and insert --actuators--.

In the Specification

In Column 6, Line 15, delete "c" and insert --$\varepsilon$--.

In Column 8, Line 55, delete "f" and insert --$f_b$--.

In the Claims

In Column 22, Claim 11, Line 52, after "according" insert --to--.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*